June 30, 1964  T. A. REILLY  3,139,043
APPARATUS FOR THE PRODUCTION OF A FOOD ARTICLE
Original Filed Sept. 6, 1960  3 Sheets-Sheet 1
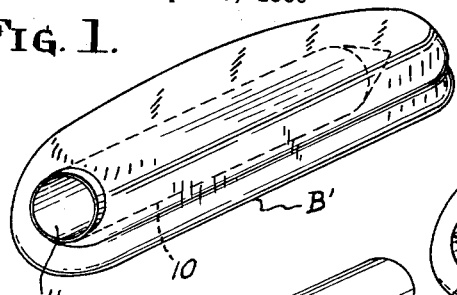
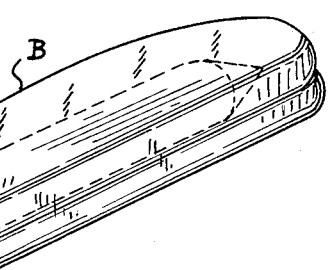
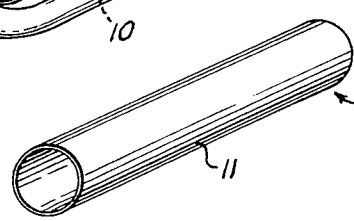
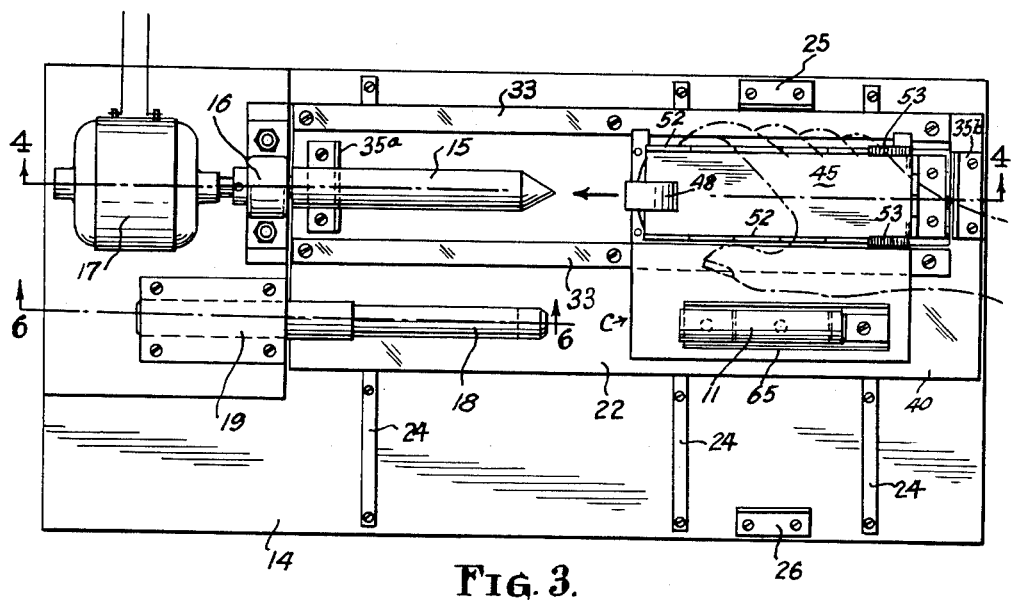
INVENTOR
THOMAS A. REILLY
BY
ATTORNEY

INVENTOR
THOMAS A. REILLY

ATTORNEY

June 30, 1964  T. A. REILLY  3,139,043
APPARATUS FOR THE PRODUCTION OF A FOOD ARTICLE
Original Filed Sept. 6, 1960  3 Sheets-Sheet 3
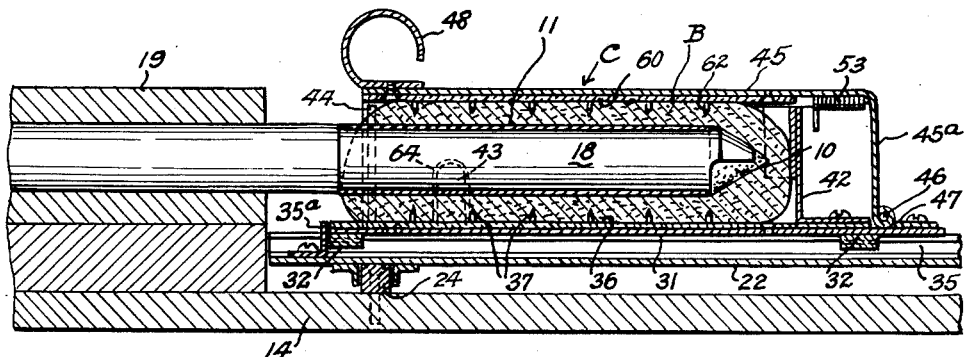
FIG. 6.
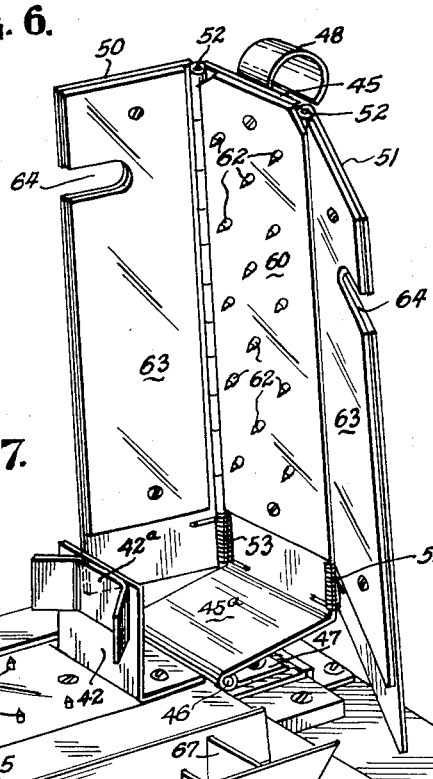
FIG. 7.
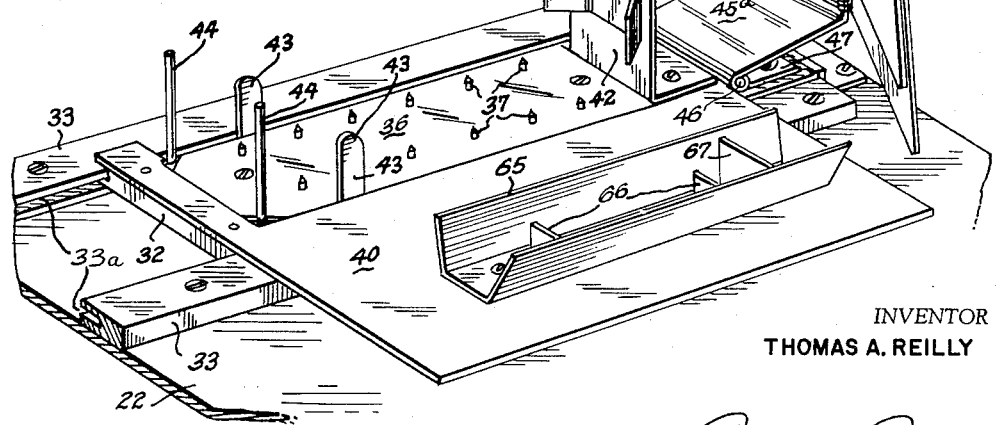
INVENTOR
THOMAS A. REILLY
BY
ATTORNEY

United States Patent Office 3,139,043
Patented June 30, 1964

3,139,043
APPARATUS FOR THE PRODUCTION
OF A FOOD ARTICLE
Thomas A. Reilly, 1616 21st St. S., St. Petersburg, Fla.
Original application Sept. 6, 1960, Ser. No. 54,309.
Divided and this application May 2, 1962, Ser. No. 193,896
4 Claims. (Cl. 107—1)

The present invention relates to an improved apparatus for a bread-like food article, such as a bun, having an axial opening therein for receiving edible material and which opening has a removable disposable sleeve therein to prevent distortion of the opening. The present application is a division of my co-pending application Serial No. 54,309 filed September 6, 1960 and now abandoned.

An object of the present invention is the provision of apparatus for forming an article of bread having an opening therein adapted to receive an edible, such as a weiner, the form of the opening being maintained by an elongated member placed in the opening at the time of the formation thereof, and preferably, the elongated member comprises an inexpensive removable sleeve, such as a roll of paper. The opening in the bread article is formed by an arbor-like member which is forced into the body portion of the bread while the outsides of the bread are confined so that the core of the bread is crowded or compacted radially of the member, thereby strengthening the walls of the opening formed in the bread product.

A further object of the present invention is the provision of an apparatus for forming the opening in a bread product, such as an elongated so-called "hot dog" bun, and placing a cylindrical member in the longitudinally formed opening, which member is preferably a paper cylinder.

In carrying out the invention, I provide apparatus having a smooth surface cylindrical opening forming member which is preferably rotated on its axis by a motor so that it may be easily inserted into a bun to form an opening in the latter, a cradle associated with the member and adapted to receive and hold a bread product, such as the well known "hot dog" bun, the cradle and arbor having guide means by which relative movement of the cradle and member is achieved to direct the forming member into the bread in a path to form a longitudinal opening in the bread, a mandrel for receiving a paper sleeve or the like thereon, the cradle and mandrel being movable relative to one another to cause the bread in the cradle to receive the sleeve on the mandrel whereby the sleeve is deposited within the opening formed in the bread.

A further object of the invention is the provision of apparatus of the character mentioned comprising a cradle for receiving a bread product, such as a bun, and for confining the outer sides of the bun against spreading while the opening is force formed therein by the forming member.

Other objects and advantages of the invention will be apparent from the following description of a preferred form thereof, reference being made to the accompanying drawings wherein:

FIG. 1 is a perspective view of a "hot dog" bun formed according to my invention, including a retaining sleeve therein;

FIG. 2 is a similar view to FIG. 1, but showing the retaining sleeve removed from the bun;

FIG. 3 is a top plan view of apparatus for forming an opening in a "hot dog" bun and for applying a removable sleeve thereto;

FIG. 6 is a sectional view taken along lines 6—6 of FIG. 3, but showing certain parts of the apparatus in different position and on a larger scale;

FIG. 7 is a perspective view of a bun receiving cradle apparatus; and

Figure 4:
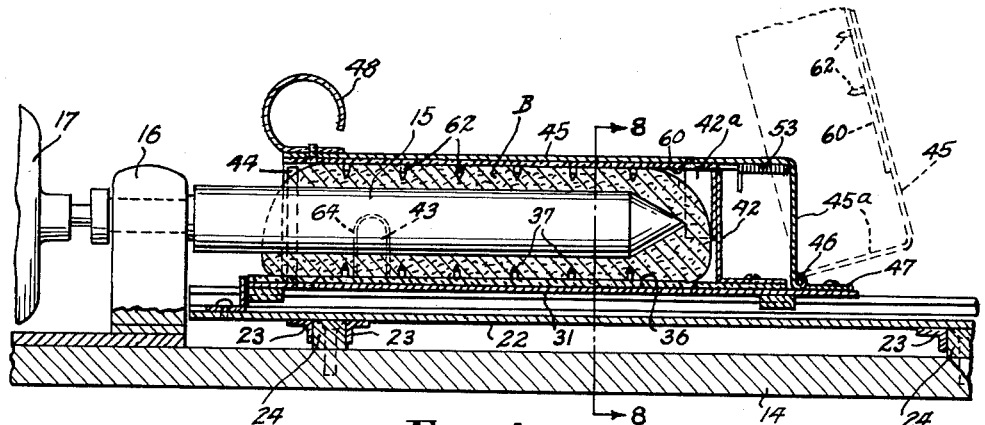
FIG. 4 is a sectional view taken substantially along lines 4—4 of FIG. 3 but on an enlarged scale and showing certain parts of the apparatus in different relationship.
Figure 5:
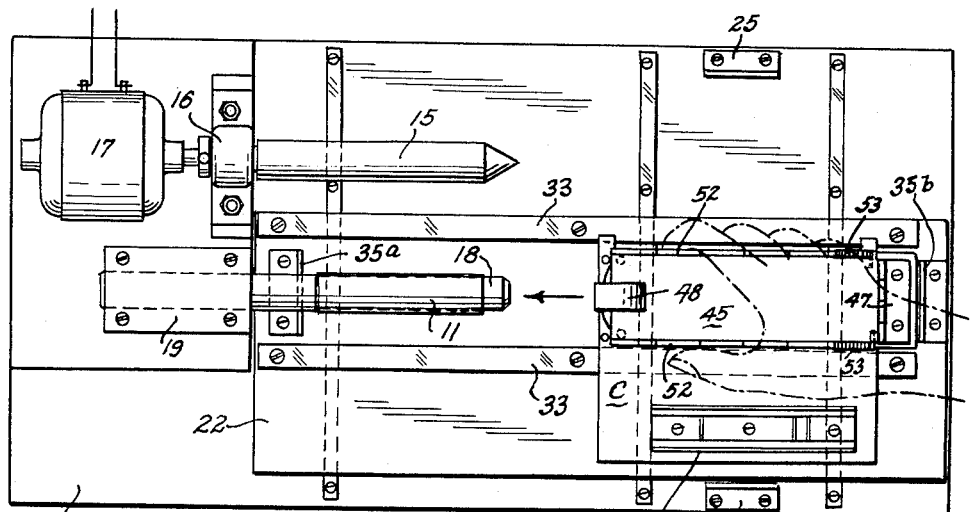
FIG. 5 is a view similar to FIG. 3 but showing part of the apparatus in a different position.
Figure 8:
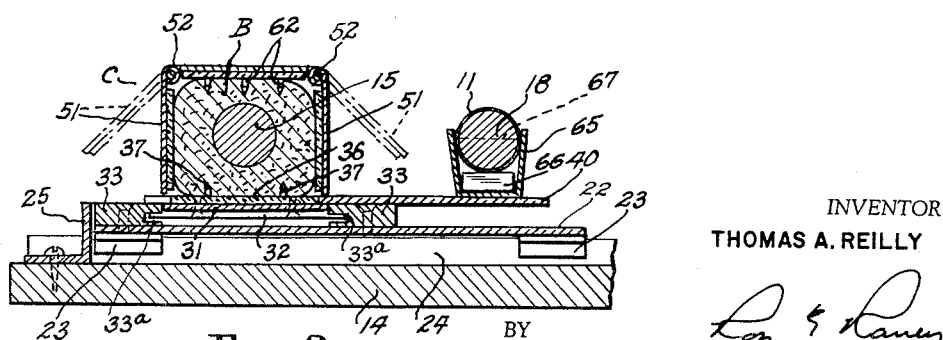
FIG. 8 is a sectional view taken substantially along lines 8—8 of FIG. 4.

In one aspect of the invention I provide a bread product, such as a "hot dog" bun which is shown in FIGS. 1 and 2, comprising an elongated baked bun B having a longitudinal opening 10 formed therein and extending from one end of the bun and terminating short of the other end so that a suitable edible product, such as a wiener, can be easily inserted into and retained in the bun. Preferably, opening 10 has a sleeve 11 therein to retain the form of the opening, and in the preferred form, sleeve 11 is of paper which is inexpensive and can be readily removed and disposed of when the bun is ready for eating. Opening 10 is of such size as to accommodate the usual "hot dog" or weiner so that the bun completely surrounds the body of the weiner, thereby securely retaining it in place and facilitating the handling of the bun. It will be understood that other suitable forms of openings or edible material could be utilized. Preferably, opening 10 is formed by forcing the core or central portion of the bun outwardly, after the bun has been baked, shortly after which sleeve 11 is inserted to retain the opening in the desired form until ready for use.

Referring to FIGS. 3 through 8, an apparatus for forming opening 10 in the bun and applying sleeve 11 thereto is shown, and it comprises a base 14 on which a smooth, cylindrical, pointed forming member 15 is rotatably supported by a bearing 16 attached to the base. Member 15 is rotated about its axis by an electric motor 17 supported on base 14, and is adapted to be inserted into a bun and forms a wiener receiving opening in the latter, as described more fully hereinafter.

A mandrel 18 is supported parallel to forming member 15 by an anchor block 19 located on base 14, and the mandrel is adapted to receive a paper sleeve 11 thereon and to support the sleeve for insertion into the opening formed by the forming member, which is described more completely hereinafter. Both member 15 and mandrel 18 are disposed several inches above base 14, and the axes thereof are at the same level.

Cradle means C is provided in which a wiener bun is supported and confined while it is moved over forming member 15 to form the longitudinal extended opening therein, and after the bun has been withdrawn, the cradle means is shifted so that the opening in the bun is aligned with mandrel 18 on which a paper sleeve 11 has been disposed, the bun then being guided over the mandrel which inserts and deposits the sleeve inside the opening in the bun. In the form of the invention shown, means is provided for guiding the bun carrying cradle C relative to member 15 and mandrel 18, and comprises a carriage or shiftable platform structure including a plate 22 having three pairs of channel-shape guides 23 only two of which are shown, and which comprise spaced angle irons attached to the under side of the plate and extending transversely thereof. These pairs of guides receive therebetween parallel rails 24 which are attached, as by screws, to the upper face of base 14 and extend transversely of the base so that the platform 22 can be shifted laterally relative to member 15 and mandrel 18. Preferably, angular stop members 25 and 26 are attached to base 14 at opposite sides thereof to limit shifting movement of platform 22 along rails 24.

Cradle C for holding a bun B therein is mounted on platform 22 on guide means so that it can move longitudinally and parallel to the axes of forming member 15 and mandrel 18. Cradle C comprises a rectangular plate 31 which has laterally projecting slide bars 32 attached thereto at opposite ends and the ends of which project into two parallel grooves 33a of guide bars 33 attached to carriage 22 and which extend parallel to the axes of member 15 and mandrel 18. As readily seen in FIGS. 7 and 8, guide bars 33 have grooves 33a thereof facing one another so as to receive the ends of slide bars 32 which slidingly support the cradle for longitudinal movement relative to member 15 and mandrel 18. The extent of movement of cradle C along guide bars 33 is limited by angular stop members 35a and 35b attached to plate 22 between guide bars 33.

A liner plate 36 is attached to the upper side of plate 31 and has a plurality of upwardly projecting pins 37 formed thereon which are spaced more or less uniformly throughout the length of the plate for piercing the bottom of the bun placed thereon to prevent sliding or bunching of the bun as the bun is pressed onto member 15, described hereinafter.

A tray 40 having a rectangular recess in one side is attached to plate 31 at opposite ends, the edges of the recess in the tray framing liner 36, and the tray proper projecting forwardly, as viewed in FIG. 7. An L-shaped bracket 42 is attached to tray 40 to provide a locating stop for buns placed on liner 36, and preferably, wing formations 42a are provided which are designed to fit the curved end portions of the bun. Two upstanding guidefingers 43 project from plate 31 as do two rigidly upwardly extending stop posts 44.

Cradle C also includes a top and sides for confining a bun on liner 36 and comprises an L-shaped upper plate 45 having the foot portion 45a thereof hinged by a pin 46 to a hinge member 47 attached to the right hand end of plate 31, as seen in FIGS. 4 and 7. The hinge arrangement permits cover 45 to be lowered to the position shown in FIGS. 4, 6 and 8 so that the left-hand end of the cover rests on stop pins 44 to close on the top of a bun on liner 36 or the cover may be raised to a vertical position as illustrated in FIG. 7, which raising may be accomplished by a handle 48 attached to the left hand end of the cover.

Preferably, side plates 50 and 51 are hinged along the sides of cover plate 45 by conventional hinge means 52 and urged outwardly by coil springs 53, which are supported on the hinge pins of the hinge means and which react against plate 45 and the side plates, as clearly seen in FIG. 7.

The under side of cover plate 45 has a liner plate 60 attached thereto, which is preferably formed of a plastic or any other suitable material easily maintained clean, and which has a series of pins 62 projecting therefrom arranged to pierce the upper surface of a bun placed on liner 36 and to thereby cooperate with pins 37 in preventing sliding and bunching of the bun as it is moved over forming member 15. Side plates 50 and 51 have liner plates 63 thereon similar to liners 36 and 60 which engage the sides of a bun placed on liner 36 when side plates 50 and 51 are pressed against stop posts 44, as is described more fully hereinafter. To permit side plates 50, 51 to be forced inwardly against the sides of the bun and prevent spreading thereof, opposed openings 64 are formed therein to accommodate guide fingers 43.

It will be seen that a bun can be placed on liner 36 with one end abutting bracket 42 and the opposite end portion positioned between fingers 43. Cover 45 may then be lowered onto posts 44 which presses liner 60 against the top of the bun causing pins 37 and 62 to penetrate the lower and upper surfaces of the bun. The operator may then press sides 63 inwardly against posts 44 and the side edges of bracket 42 and thereby confine the sides of the bun against lateral expansion.

Tray 40 has a trough 65 attached thereto which is formed of a sheet metal channel having transverse support members 66 and an end stop 67. The trough is positioned so that its longitudinal center line is aligned with a vertical plane through the axis of mandrel 18 when carriage 22 is against stop 25, as seen in FIG. 3. The trough 65 is dimensioned to receive a paper sleeve 11 therein which is supported on members 66 in axial alignment with mandrel 18 so that when cradle C is moved to the left on guides 33, the paper sleeve in trough 65 receives the mandrel therein, the sleeve being retained from longitudinal movement relative to the trough by stop 67. The friction between mandrel 18 and the insides of the sleeve is greater than the friction of the sleeve on the two supports 66 so that when the trough is moved to the right, the sleeve remains on the mandrel.

In operating the bun forming apparatus, motor 17 is energized and carriage 22 is moved against stop 25, a paper sleeve 11 is deposited in trough 65 and a bun B is then placed on plate 36 of cradle C and the cover 45 is lowered thereover and side plates 63 are pressed inwardly to thereby cause the bun to be confined on all sides except for the left hand end thereof, as described hereinbefore. Cradle C is then moved forwardly to the left on guide bars 33 to cause the rotating member 15 to enter the bun and spread the core of the bun radially outwardly to form a longitudinal opening 10 therein, the left-hand movement of the cradle being limited by stop 35a so that the bun piercing end of member 15 stops somewhat short of the right hand end of the bun. Concurrently with the formation of opening 10 in the bun, sleeve 11 is transferred from trough 65 onto mandrel 18, as explained hereinbefore. After opening 10 has been formed in the bun by member 15, cradle C is slid to the right to stop 35b and carriage 22 is then moved from stop 25 to stop 26, which brings the bun opening 10 into alignment with mandrel 18 on which sleeve 11 is now supported, and the cradle is then moved along guide bars 33 to the left and over mandrel 18 which inserts the sleeve into the bun. The cradle is then moved along guide bars 33 from the mandrel, the sleeve 11 being transferred thereby from the mandrel to the bun opening by friction of the walls of the opening on the sleeve, which is greater than the friction between the mandrel and sleeve. The bun is then removed from the cradle and packaged in a suitable container for sale and use, the sleeve 11 therein serving to retain the form of opening 10. When the bun is to be used, sleeve 11 is withdrawn and discarded, and a suitable edible filler, such as a wiener, is then easily inserted in the perfectly formed opening.

It is to be understood that while I have described but one form of the invention, other forms, modifications and adaptations could be embodied therein, all falling within the scope of the claims which follow.

I claim:

1. Apparatus for forming a bread product comprising, a cylindrical member adapted to form an elongated opening in a bread product such as a bun, an elongated member adapted to receive a sleeve thereon, a cradle structure for holding a bun, therein, and guide means for guiding movement of said cradle axially of said cylindrical and elongated members to cause said members to enter and withdraw from the bun held in said cradle by successive guided movements of said cradle axially of the respective said members, said guide means causing relative shifting of said cradle laterally of the axes of said members.

2. Apparatus for forming a bread product such as a bun comprising, a base, a cylindrical forming member supported above said base, an elongated member supported by said base parallel to said cylindrical member and adapted to receive a sleeve thereon of a diameter approximately that of said cylindrical member, a platform, guide means supporting said platform for movement laterally of the axes of said members, a bun receiving cradle on said platform, and means to guide said cradle along said platform in a direction parallel to the axes of said members for moving a bun in said cradle to cause said members to be successively inserted and withdrawn from the bun.

3. Apparatus for forming a bread product comprising, a base, a cylindrical member supported by said base and adapted to form an elongated opening in a bread product, an elongated member supported on said base and adapted to receive a sleeve thereon, a cradle structure for holding a bun therein, and guide means for guiding said cradle laterally of the axes of said members to successively align the axis of a bun therein with the axes of said members, and a sleeve support on said cradle structure adapted to be aligned with the axis of said elongated member when the bun is aligned with the axis of said cylindrical member.

4. Apparatus for forming a bread product comprising, a base, a cylindrical forming member supported by said base, an elongated member supported by said base in spaced parallel relation to said cylindrical member, a platform supported on said base, guide means supporting said platform for movement laterally of the axes of said members, a bun receiving cradle on said platform, means to guide said cradle along said platform in a direction parallel to the axes of said members, and means on said cradle to support a sleeve spaced from a gun in said cradle approximately the same as the space between the axes of said members.

References Cited in the file of this patent
UNITED STATES PATENTS

| | | |
|---|---|---|
| 1,748,240 | Skoverski | Feb. 25, 1930 |
| 1,871,837 | Brown | Aug. 16, 1932 |
| 2,005,395 | Rothfield | June 18, 1935 |